Dec. 1, 1936.  L. BUEHLER, JR  2,062,697
NONCONDENSABLE GAS SEPARATOR
Filed July 31, 1933
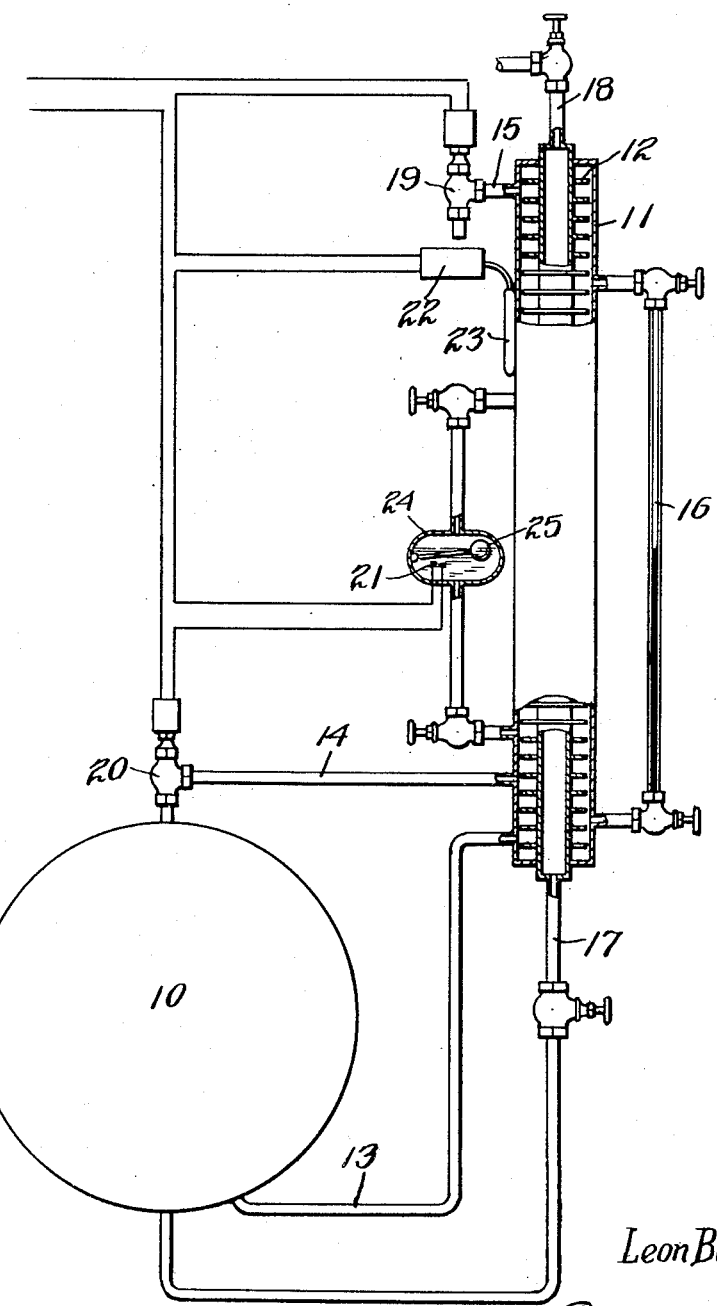
Inventor
Leon Buehler, Jr.
By
Attorney

UNITED STATES PATENT OFFICE 2,062,697

NONCONDENSABLE GAS SEPARATOR

Leon Buehler, Jr., Waynesboro, Pa., assignor to Frick Company, Waynesboro, Pa., a corporation of Pennsylvania Application July 31, 1933, Serial No. 683,077

20 Claims. (Cl. 62—115)

This invention relates to the separation of gases having different boiling points and relates in its more specific application to the art of refrigeration. Heretofore mixtures of non-condensable gases and refrigerant in refrigerating systems have been cooled so as to condense as much of the refrigerant out of the mixture of gases as possible so as to reduce the loss of refrigerant as much as possible when blowing off the non-condensable gases.

It is well known that in any gaseous mixture the pressure is the sum of the pressures of all the gases constituting the mixture. With a condensable gas in the presence of its own liquid there is a vapor pressure upon the gas and the vapor pressure and the density will correspond to the saturation point at the prevailing temperature. It follows therefore that the lower the temperature the lower will be the vapor pressure and the density of the condensable gases. It also follows that the higher the total pressure and the lower the temperature the greater will be the pressure of the non-condensable gas and the higher will be its density, since the pressure of the non-condensable gas equals the total pressure less the vapor pressure of the condensable gas.

One of the objects of my invention is to provide automatic means for keeping the total pressure as high as possible and therefore to assure that the gas separation operates with the minimum loss of condensable gas possible with the temperatures and pressures under which the machine is operated.

A further object is to return the liquid condensed in the gas separator to the main system automatically and yet without complicated automatic mechanism.

Referring to the accompanying drawing, which is made a part hereof and on which similar reference characters indicate similar parts, The single figure shows a side elevation of my device.

In the drawing reference character 10 indicates a condenser or receiver tank hereafter called a tank, to which refrigerant has been delivered from some suitable source, not shown. A gas separating vessel is indicated at 11. Within this vessel is positioned a heat transfer device having flanged heat transferring elements for cooling the gas mixture within the vessel 11. At 13 is shown a return line for liquid from the gas separator and at 14 a line for introducing the mixture of condensable and non-condensable gases to the separator 11. Non-condensable gases are withdrawn from the separator through pipe 15 which is controlled by valve 19. A sight gage 16 indicates the liquid level in the gas separator at all times. Cooling fluid for the gas separator is delivered through pipe 17 and drawn off through pipe 18, this device being controlled by manually operable cut-off valves as desired. The cooling fluid which is passed through pipes 17 and 18 may be a refrigerant such as ammonia which is received from the refrigerating plant or it may be any other cold fluid such as brine, cold water or any other available medium for cooling the gaseous mixture in the vessel 11 below the temperature of the vessel 10. The condensable gas and liquid in the vessel 10 is usually substantially at its boiling point. Passage of the mixture of condensable and non-condensable gases from the tank or receiver 10 to the gas separator 11 is controlled by valve 20. Valves 19 and 20 are preferably operated by solenoids controlled by a switch 21. This switch is positioned in a tank 24 and the switch is operated by a float 25. The float switch 21 is so arranged that when liquid in the vessel 11 drops below a given point the switch is closed and when the switch is closed the circuit is arranged so as to open valve 19 so that gas may be drawn off from the top of the gas separating tank. When the liquid in tank 24 rises and opens the switch 21 the valve 19 is closed and the valve 20 is open. A thermostat switch 22 is also in circuit with the solenoids which operate valves 19 and 20 and this switch is controlled by a thermostat 23. Whenever the vessel 11 is warmer than a predetermined temperature, switch 22 is open so that valve 19 will be closed and fluid will not be drawn out of the gas separating tank 11. The reason for this is that if the mixture of gases in tank 11 is at too high temperature the liquid will drop out of the vessel 11 even though no non-condensable gas is present so that valve 19 must be kept shut when temperature is high. Switch 22 therefore prevents waste of rich condensable gases when the separator is not cooled to sufficiently low temperature.

In operation the gas separator 11 is cooled down by the surface cooler 12 by means of the cooling fluid which is circulated through pipe 17 and 18. The condensable gases liquefy in the separator and drop to the bottom of the separator reducing the pressure in the vessel 11 and permitting more gas to flow in through pipe 14. This will continue so long as the gas is liquefied in the tank 11 at a faster rate than it can flow in through pipe 14. While line 13 is a pipe or conduit for returning liquefied refrigerant from the separator to tank 10, the liquid passes to and fro therein, as it will be noted that any reduction of pressure in the vessel 11 will cause liquid also to flow from the bottom of the vessel 10 up into the vessel 11 through the pipe 13 until the pressure in 11 equalizes the pressure in 10 due allowance being made for the difference in static pressure due to the unbalanced liquid and gas columns, i. e. for static conditions, the pressure at any point in vessel 11, plus the difference in liquid levels between the vessels 10 and 11 plus the distance from the liquid level in vessel 11 to the given point as a gas column will equal the pressure at any point in vessel 10, plus its distance above the liquid level in vessel 10 as a gas column, taking in consideration suitable factors of density, etc. to bring all of these values to the same units. Since liquid level in vessel 11 is usually somewhat higher than the liquid level in vessel 10 the pressure level in vessel 11 will be slightly lower than in vessel 10 and gas will flow into vessel 11 through the connection 14. The non-condensable gases in vessel 11 will rise above the liquid level in this vessel and occupy the gas space above the liquid in the vessel. Condensable gas at the vapor pressure will exist only momentarily. If the temperature of vessel 11 is low the quantity of condensable gas will be very small and since the pressure in the gas space in vessel 11 is only very little less than in the gas space in vessel 10 the pressure and density of the non-condensable gas will be relatively high. As long as the temperature in vessel 11 is below the temperature in vessel 10 the liquid level in vessel 11 will fluctuate up and down in accordance with the quantity of non-condensable gas in vessel 11 and liquid condensed in vessel 11 will collect in the bottom of this vessel and return automatically to vessel 10 through pipe 13.

When a considerable amount of non-condensable gas has collected in vessel 11, as indicated by the gauge glass, the valve 19 will be opened allowing this gas to blow off. As the gas blows off, liquid level in vessel 11 rises and liquid displaces gas which is blown off. As a result, the gas pressure in vessel 11 is alway kept very close to the maximum pressure available, the gas separator therefore always operates at its maximum efficiency. The devices now generally used do not allow liquid to displace gas as it is removed from the separator so that the pressure drops as the gas is removed and the efficiency of the device is sharply reduced as gas is increasingly removed from the device. Some devices now in use maintain the pressure in the gas separator approximately constant by supplying the outlet 15 with an automatic pressure actuated relief valve. The objection to this method is that usually the pressure available in the main system is constantly fluctuating so that it is impossible to set a relief valve at the pressure available in the system and keep it correctly set. As distinguished further from present practice my device automatically returns the condensed gases from the separator to the main receiver tank 10 without any automatic valves.

It will be obvious to those skilled in the art that various changes may be made in my device without departing from the spirit of the invention and therefore I do not limit myself to what is shown in the drawing and described in the specification, but only as indicated by the appended claims.

Having thus fully described my said invention, what I claim as new and desire to secure by Letters Patent, is:

1. A device for separating non-condensable gases from condensable gas comprising a tank, a separating vessel, the upper portion of which is above the liquid level in the tank, the lower portion of the vessel being connected to the tank at a point below said liquid level for the passage of liquid to and fro therebetween, means for cooling said separating vessel, a connection for introducing non-condensable gas, condensable gas, or a mixture of gases from said tank into the separating vessel, and means controlled by the liquid level in the separating vessel for removing gases which collect in the upper portion of the separating vessel, substantially as set forth.

2. A device for removing condensable gas from a mixture with non-condensable gas comprising a tank, a separating vessel forming a U-tube in conjunction with said tank containing liquid through which the liquid may pass to and fro, means for cooling the separating vessel, means for introducing non-condensable gas and condensable gas into the separating vessel from said tank, and means controlled by the liquid level in the separating vessel for removing gas from the top of said vessel, substantially as set forth.

3. A device for removing condensable gas from a mixture with non-condensable gas comprising a tank, a separating vessel forming a U-tube in conjunction with said tank containing liquid, means for cooling the separating vessel, means responsive to the liquid level in said separating vessel for introducing non-condensable gas and condensable gas to the separating vessel, and means for removing gas from the top of said separating vessel, substantially as set forth.

4. A device for removing condensable gas from a mixture with non-condensable gas comprising a tank, a separating vessel forming a U-tube in conjunction with said tank containing liquid, means for cooling the separating vessel, means for introducing non-condensable gas and condensable gas into the separating vessel, means for removing gas from the top of said vessel, both of said last-named means being responsive to the liquid level in said separating vessel, substantially as set forth.

5. A device for separating non-condensable gas from condensable gas comprising a tank, a separator forming a U-tube with said tank, means for cooling the separating vessel and means for keeping the gas space in the separating vessel at substantially the pressure in the system due to displacement of liquid by gas or gas by liquid in the separating vessel as the quantity of gas in said vessel changes, means for withdrawing gas from the separator, and means to prevent the withdrawing of gas from said separator in the event the liquid level therein exceeds a predetermined level and the gas in the separator exceeds a predetermined temperature, substantially as set forth.

6. A device for removing non-condensable gas from refrigerating systems comprising a separator mounted with its upper portion above a source of liquid in the high pressure side of said system and with its lower portion equalized to beneath said liquid level by a connection for conducting the liquid to and fro between the high pressure side of the refrigerating system and the lower portion of the separator, a connection from the separator to any point where non-condensable gases may be withdrawn from the system, a connection for removing non-condensable gas from the top of said separator, and means for preventing the passage of non-condensed gases to the separator when the gases are being withdrawn therefrom.

7. A device for removing non-condensable gas from refrigerating systems comprising a separator with its upper portion above a supply of liquid in the high pressure side of said system and an equalizing connection from the lower portion of said separator to beneath the said liquid level, means for introducing non-condensable gas or mixtures of non-condensable gas and condensable gas into said separator, means for cooling said separator, means for withdrawing non-condensable gas from said separator at practically condenser pressure, and means to prevent withdrawing of gases from said separator in the event the liquid level therein exceeds a predetermined level and the gas in the separator exceeds a predetermined temperature, substantially as set forth.

8. A device for removing non-condensable gas from refrigerating systems comprising a separator for connection with the high pressure side of said system including, means for introducing non-condensable and condensable gas mixtures therefrom into said separator, an equalizing pipe from the lower portion of said separator to beneath the supply of liquid level in the system and through which liquid passes to and fro therebetween to maintain a gas pressure in the said separator practically equal to condenser pressure through displacement of liquid by gas or gas by liquid to compensate for changes in gas volume in the said separator, means for discharging gas from the upper portion of the separator, means for cutting off the passage of gases from the system to the separator, and automatic means simultaneously controlling said cutting off of the passage of gases to the separator and said gas discharge means.

9. A device for removing non-condensable gas from refrigerating systems having means to cool the non-condensable gas to low temperatures so as to condense out as much of the condensable gas as possible and having means to keep said device at substantial condenser pressure so that the proportion of condensable gas may be kept as small as possible, means for withdrawing gas from the device, and means to prevent the withdrawing of gas therefrom in the event the level of liquid formed therein should exceed a predetermined level and the temperature of the gases exceeds a predetermined temperature, substantially as set forth.

10. A device for removing condensable gas from a mixture with non-condensable gas comprising a tank containing liquid, a separating vessel having a system of piping connecting it with said tank, said separating vessel forming a U-tube in conjunction with said tank, means for cooling the separating vessel, means responsive to the liquid level in said separating vessel or said piping forming part of said U-tube for introducing non-condensable gas and condensable gas to the separating vessel, and means for removing gas from above said liquid level, substantially as set forth.

11. A device for removing condensable gas from a mixture with non-condensable gas comprising a tank containing liquid, a separating vessel forming one leg of a U-tube in conjunction with said tank, means for cooling the separating vessel, means for introducing non-condensable gas and condensable gas into the separating vessel, means for removing gas from said vessel both of said last named means being responsive to the liquid level in the leg of the U-tube of which the separating vessel forms a part, substantially as set forth.

12. A device for removing condensable gas from a mixture with non-condensable gas comprising a tank containing liquid, a separating vessel forming one leg of a U-tube in conjunction with said tank, means for cooling the separating vessel, means for introducing non-condensable gas and condensable gas into the separating vessel, means for removing gas from any point in the leg of the U-tube of which the separator forms a part but above the liquid level in said leg, said last named means being responsive to said liquid level, substantially as set forth.

13. A device for removing condensable gas from a mixture with non-condensable gas comprising a tank containing liquid, a separating vessel forming one leg of a U-tube in conjunction with said tank, means for cooling the separating vessel, means for introducing non-condensable gas and condensable gas into the leg of the U-tube of which the separating vessel forms a part, means for removing gas from said leg above the liquid level, said means being responsive to the liquid level in said leg, substantially as set forth.

14. A device of the kind described comprising a tank, containing liquid, a gas separating vessel, a connection between said tank and said vessel permitting interchange of liquid between said tank and vessel, a connection from said tank to said vessel for delivering gases from said tank to said vessel and liquid level responsive means for controlling the flow of gas from said tank to said vessel, substantially as described.

15. In a refrigerating system, the method of removing non-condensable gas from the system, comprising delivering a mixture of non-condensable gas and gaseous refrigerant to a vessel from the high pressure side of the system causing liquid refrigerant to be forced therefrom back to the system, cooling said vessel to condense some of the gaseous refrigerant and to lower the pressure in said vessel sufficiently to again draw liquid refrigerant into said vessel above the level of the supply of liquid refrigerant in the high pressure side of said system, collecting the non-condensable gases in the top of said vessel above the liquid level in said vessel, the quantity of non-condensable gas collected determining the liquid level in the vessel, and removing said collected non-condensable gas.

16. The method of removing non-condensable gas from a mixture with condensable gas, comprising cooling said mixture to liquefy condensable gas in a vessel, collecting non-condensable gas in the upper portion of said vessel, filling the balance of the vessel with liquid freely passing to and fro from another source, the liquid level of said other source being below the liquid level in the vessel so that the pressure of the non-condensable gas is equal to the pressure of the liquid in the other source less the pressure due to the difference in said liquid levels, and withdrawing collected non-condensable gas from said vessel.

17. In a refrigerating system, a separator for the removal of non-condensable gases from the high pressure side of the refrigerating system from a point in which condensable and non-condensable gases collect, a connection for delivering said gases therefrom to the separator, a connection between the lower portion of the separator and the high pressure side of the refrigerating system for the free passage of liquid refrigerant to and fro therebetween, means for cooling the separator to condense some of the gaseous refrigerant from the gases delivered to the separator and to lower the pressure therein sufficiently to draw liquid refrigerant into the separator from the high pressure side of the system, and means whereby gases which collect in the upper portion of the separator may be removed.

18. In a refrigerating system, means for urging a portion of the system in which liquid refrigerant and gases collect including a cooling chamber, a pair of conduits connecting said cooling chamber with said portion of the system, one of said conduits conducting gases from the system to said cooling chamber and having a valve therein, the second conduit arranged for the passage of liquid refrigerant between said cooling chamber and the system, an outlet from said cooling chamber for the removal of non-condensed gases therefrom, a valve in said outlet, and thermally controlled means for alternately actuating said valves for transferring the gases from the system to the cooling chamber and non-condensed gases in the cooling chamber through said outlet.

19. In a refrigerating system, means for purging a portion of the system in which liquid refrigerant and gases collect including a cooling chamber, a pair of conduits connecting said cooling chamber with said portion of the system, one of said conduits conducting gases from the system to said cooling chamber and having a valve therein, the second conduit arranged for the passage of liquid refrigerant between said cooling chamber and the system, an outlet from said cooling chamber for the removal of non-condensed gases therefrom, a valve in said outlet, and fluid level controlled means for alternately actuating said valves for transferring the gases from the system to the cooling chamber and non-condensed gases in the cooling chamber through said outlet.

20. In a refrigerating system, means for purging a portion of the system in which liquid refrigerant and gases collect including a cooling chamber, a pair of conduits connecting said cooling chamber with said portion of the system, one of said conduits conducting gases from the system to said cooling chamber and having a valve therein, the second conduit arranged for the passage of liquid refrigerant between said cooling chamber and the system, an outlet from said cooling chamber for the removal of non-condensed gases therefrom, a valve in said outlet, and thermally and fluid level controlled means for alternately actuating said valves for transferring the gases from the system to the cooling chamber and non-condensed gases in the cooling chamber through said outlet.

LEON BUEHLER, JR.